US011247192B2

(12) United States Patent
Kato et al.

(10) Patent No.: US 11,247,192 B2
(45) Date of Patent: Feb. 15, 2022

(54) PACKING MATERIAL FOR HILIC COLUMNS, HILIC COLUMN FILLED WITH SAME, AND METHOD FOR ANALYZING OLIGOSACCHARIDE WITH USE OF SAME

(71) Applicant: SHOWA DENKO K.K., Tokyo (JP)

(72) Inventors: Junya Kato, Tokyo (JP); Hideyuki Kondo, Yokohama (JP); Ryuji Takahashi, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 151 days.

(21) Appl. No.: 16/327,437

(22) PCT Filed: Aug. 10, 2017

(86) PCT No.: PCT/JP2017/029118
§ 371 (c)(1),
(2) Date: Feb. 22, 2019

(87) PCT Pub. No.: WO2018/037940
PCT Pub. Date: Mar. 1, 2018

(65) Prior Publication Data
US 2019/0184372 A1    Jun. 20, 2019

(30) Foreign Application Priority Data
Aug. 26, 2016 (JP) .............................. JP2016-165907

(51) Int. Cl.
*B01J 20/26* (2006.01)
*G01N 30/88* (2006.01)
(Continued)

(52) U.S. Cl.
CPC ............ *B01J 20/267* (2013.01); *B01D 15/00* (2013.01); *B01D 15/38* (2013.01); *B01D 15/42* (2013.01);
(Continued)

(58) Field of Classification Search
CPC ........ B01D 15/00; B01D 15/38; B01D 15/42; B01J 20/26; B01J 20/28; B01J 20/28004;
(Continued)

(56) References Cited

U.S. PATENT DOCUMENTS 5,503,933 A  *  4/1996  Afeyan ................. B01D 15/08
                                              210/198.2
7,361,273 B2     4/2008  Heikkila et al.
(Continued)

FOREIGN PATENT DOCUMENTS

CN       101193928 A    6/2008
CN       102245304 A   11/2011
(Continued)

OTHER PUBLICATIONS

Churms, Shirley C. "Recent progress in carbohydrate separation by high-performance liquid chromatography based on hydrophilic interaction." Journal of chromatography A 720.1-2 (1996): 75-91. (Year: 1996).*
(Continued)

*Primary Examiner* — Samuel P Siefke
*Assistant Examiner* — Oyeleye Alexander Alabi
(74) *Attorney, Agent, or Firm* — Sughrue Mion, PLLC (57) ABSTRACT

Provided is a packing material for HILIC columns for more accurately and more easily performing oligosaccharide analysis by liquid chromatography; an HILIC column which is filled with the packing material for HILIC columns; and a method for analyzing an oligosaccharide with use of this packing material for HILIC columns A packing material for HILIC columns according to the present invention is composed of particles, each of which is obtained by reacting glycidol to a hydroxyl group of a porous cross-linked polymer base material having the hydroxyl group, and
(Continued)

which have a hydrophilicity index of 2.30 or more and a surface-pH index of from 0.95 to 1.05.

7 Claims, 2 Drawing Sheets

(51) Int. Cl.
| | | |
|---|---|---|
| *B01D 15/38* | (2006.01) | |
| *B01D 15/00* | (2006.01) | |
| *B01J 20/28* | (2006.01) | |
| *B01D 15/42* | (2006.01) | |
| *B01J 20/281* | (2006.01) | |
| *B01J 20/285* | (2006.01) | |

(52) U.S. Cl.
CPC ............. *B01J 20/26* (2013.01); *B01J 20/28* (2013.01); *B01J 20/281* (2013.01); *B01J 20/28004* (2013.01); *B01J 20/285* (2013.01); *B01J 20/28083* (2013.01); *G01N 30/482* (2013.01); *G01N 30/88* (2013.01); *B01J 2220/54* (2013.01); *B01J 2220/58* (2013.01); *B01J 2220/86* (2013.01); *G01N 2030/8836* (2013.01)

(58) Field of Classification Search
CPC .. B01J 20/28083; B01J 20/281; B01J 20/285; B01J 2220/54; B01J 2220/58; B01J 2220/86; G01N 30/482; G01N 30/88; G01N 2030/8836

See application file for complete search history.

(56) References Cited

U.S. PATENT DOCUMENTS

| | | | |
|---|---|---|---|
| 2014/0021136 A1 | 1/2014 | Qiu et al. | |
| 2017/0007981 A1* | 1/2017 | Nakajima | ............... G01N 30/48 |
| 2018/0104669 A1 | 4/2018 | Matsui et al. | |

FOREIGN PATENT DOCUMENTS

| | | |
|---|---|---|
| CN | 102770765 A | 11/2012 |
| CN | 104619416 A | 5/2015 |
| EP | 2254696 B1 | 9/2015 |
| EP | 3112858 A1 | 1/2017 |
| JP | 04-158260 A | 6/1992 |
| JP | 2000-055897 A | 2/2000 |
| JP | 2013-506115 A | 2/2013 |
| JP | 6731402 B2 | 7/2020 |
| WO | 2004/003542 A1 | 1/2004 |
| WO | 2011/038873 A1 | 4/2011 |
| WO | 2015/129622 A1 | 9/2015 |

OTHER PUBLICATIONS

Extended European Search Report dated Mar. 19, 2020, from the European Patent Office in Application No. 17843424.7.

Communication dated Jul. 28, 2020, from the State Intellectual Property Office of the P.R.C. in application No. 201780050874.X.

Kawagoe et al., "Analysis and Evaluation of Biofuel Production", Toray Research Center, Inc., The TRC News, Jul. 2010, p. 15-21, No. 111.

"Carbohydrate, Oligosaccharide, and Organic Acid Separations", Phenomenex, Website, http://az621941.vo.msecnd.net/documents/6f28134c-e141-44d3-b884-9f0ac38b47eb.pdf.

H. Terada, "Analysis of Biofuel (Part 3) Determination of Saccharides in Bioethanol Production", Shimadzu Corporation, Shimadzu Application News, 2009, No. L374.

Yuusuke Kawachi et al., "Chromatographic characterization of hydrophilic interaction liquid chromatography stationary phases: Hydrophilicity, charge effects, structural selectivity, and separation efficiency", Journal of Chromatography A, 2011, pp. 5903-5919, vol. 1218, No. 35.

International Search Report of PCT/JP2017/029118 dated Oct. 24, 2017 [PCT/ISA/210].

Communication dated Feb. 9, 2021 by the Japanese Patent Office in application No. 2018-535599.

* cited by examiner

1. TOLUENE
2. THEOBROMINE (Tb)
3. THEOPHYLLINE (Tp)
4. 2'-DEOXYURIDINE (2dU)
5. URIDINE (U)

PACKING MATERIAL FOR HILIC COLUMNS, HILIC COLUMN FILLED WITH SAME, AND METHOD FOR ANALYZING OLIGOSACCHARIDE WITH USE OF SAME

CROSS REFERENCE TO RELATED APPLICATIONS

This application is a National Stage of International Application No. PCT/JP2017/029118, filed Aug. 10, 2017, claiming priority to Japanese Patent Application No. 2016-165907, filed Aug. 26, 2016.

TECHNICAL FIELD

The present invention relates to a packing material for hydrophilic interaction chromatography (HILIC) columns, a HILIC column, and a method for analyzing an oligosaccharide.

This application claims priority right based on Japanese Patent Application No. 2016-165907 filed in Japan on Aug. 26, 2016, the content of which is incorporated herein by reference.

BACKGROUND ART

An oligosaccharide is an oligomer of saccharides in which monosaccharides are bonded by a glycosidic bond. For example, it is well known that oligosaccharides are useful, which have a physiological action of promoting the activity of bifidobacteria.

Particularly in recent years, interest in oligosaccharides is high because a reaction intermediate of a bioalcohol fuel production process using plant as raw material includes oligosaccharides. A process of obtaining reaction intermediates containing a monosaccharide and an oligosaccharide from a plant raw material is called saccharification. The saccharification process is an important process for determining productivity and economic efficiency in a bioalcohol fuel production.

In the bio-alcohol fuel production, ethanol is obtained by alcohol fermentation of glucose, which is mainly a monosaccharide. In this case, a quality of the reaction intermediate containing monosaccharides and oligosaccharides, as well as other impurities greatly affects a fermentation efficiency. That is, in order to further improve a productivity of the bioalcohol fuel, a method for accurately and simply analyzing the components of the reaction intermediates obtained through the saccharification process is required.

It is known that a liquid chromatography is a commonly used method for separating and analyzing a natural product, a fermentation product, a culture product, or a target substance among the synthesis reaction products. It is also known that a liquid chromatography is a commonly used method for separating and purifying them. It is further known that a liquid chromatography is a commonly used method for analyzing the reaction intermediate components of a bioalcohol fuel production. (Non-Patent Document 1). Measurement examples intended to analyze oligosaccharide components are also introduced (Non-Patent Document 2, Non-Patent Document 3).

However, as typified by Non-Patent Document 1, an identification of an oligosaccharide is often not able to be performed simply only by focusing on analysis of a monosaccharide. One of reasons is that separation of oligosaccharides is not sufficient. Another reason is that an optimization of analysis conditions is very complicated. It is disclosed that separation of oligosaccharides is performed by using a separation mode by ligand interaction in Non-Patent Document 2, or by using size exclusion separation mode. However, there is a problem that the separations are insufficient in either case, and if it is attempted to improve the separation, it takes an extremely long time.

As a separation mode of saccharides by liquid chromatography, except for the above-mentioned separation modes by ligand interaction, a separation mode by hydrophilic interaction (a HILIC mode) is preferable in hydrophilic interaction chromatography (HILIC) (for example, Non-Patent Document 3). An oligosaccharide with a larger molecular weight, which is relatively more hydrophilic in separation by HILIC mode, have a stronger retention and a slower elution order.

Thus, although a HILIC column is capable of analyzing oligosaccharides, when the measurement uses a conventional HILIC column product, the oligosaccharides may not be separated. This may be because many conventional HILIC columns contain an amino group, an amide group or the like as a functional group structure of packing material particles in order to express hydrophilic interactions for a retention force, and the functional groups not only express a purely hydrophilic interaction but also express an acid-base interaction or an electrostatic interaction for a retention force. In other words, a retention ability of the oligosaccharides having a relatively large molecular weight is not sufficient and the separation becomes worse. Therefore, in the oligosaccharides analysis using the conventional HILIC columns, it is necessary to apply a gradient elution method in which an eluent composition of the mobile phase is gradually changed (for example, Non-Patent Document 3). Although the separation may be improved by using a gradient elution method, setting of the analytical condition becomes complicated. Since it is necessary to prepare a plurality of kinds of mobile phase liquids and dedicated apparatus for the gradient elution method, the method is not easy at all.

[Non-Patent Document 1] Toray Research Center, The TRC News, No. 111 (July 2010), p. 15.

[Non-patent document 2] Phenomenex website, http://az621941.vo.msecnd.net/documents/6f28134c-e141-44d3-b884-9f0ac38b47eb.pd f.

[Non-Patent Document 3] Shimadzu Corporation, Shimadzu Application News No. L374

DISCLOSURE OF THE INVENTION

The present invention has been made in view of such circumstances, and it is an object of the present invention to provide a packing material for HILIC columns for more accurately and more easily performing oligosaccharide analysis by a liquid chromatography, a HILIC column filled with the packing material, and to provide a method for analyzing oligosaccharides using the column.

As a result of a diligent research to solve the above problems, the inventors of the present invention have found out that it is possible to obtain a HILIC column which exhibits a desired performance, by properly selecting a base material of a packing material for HILIC columns; remarkably hydrophilizing the surface of the packing material for HILIC columns by a chemical modification; and buffering and neutralizing an acidity or basicity derived from the chemical structure of the base material by the chemical modification. And then, the inventors have thus completed the present invention.

That is, the present invention relates to the following items.

[1] A packing material for HILIC columns, comprising a cross-linked polymer base material having a hydroxyl group,
wherein the cross-linked polymer base material is porous particles;
a glycidol is reacted with the hydroxyl group of the cross-linked polymer base material;
a hydrophilicity index is 2.30 or more;
and a surface-pH index is from 0.95 to 1.05,
wherein the hydrophilicity index is defined by a separation coefficient of α1 (U/2dU), when performing a liquid chromatography measurement of a uridine (U) and a 2'-deoxyuridine (2dU) in a HILIC separation mode condition;
the surface-pH index is a separation coefficient of α2 (Tb/Tp), when performing a liquid chromatography measurement of a theobromine (Tb) and a theophylline (Tp) in a HILIC separation mode condition;
the separation coefficient α1 (U/2dU) and the separation coefficient α2 (Tb/Tp) are ratios of retention factors k of the materials, respectively;
each retention factor k is defined by $k=(t-t_0)/t_0$, wherein to is an elution time of toluene and, t is an elution time of each substance; and
a condition of the liquid chromatography measurement in the HILIC separation mode is shown as below:
a column temperature is 30° C.; and
a mobile phase is a mixed liquid of an acetonitrile and a water solution in a ratio (acetonitrile/water solution) of 90/10 (volume before mixing) wherein the water solution contains 10 mM acetic acid and 10 mM ammonium acetate.

[2] The packing material for HILIC columns according to [1], wherein the porous cross-linked polymer base material having a hydroxyl group is a copolymer of vinyl alcohol and triallyl isocyanurate.

[3] A HILIC column, comprising
the packing material for HILIC columns according to [1] or [2], and
a liquid chromatography casing in which the packing material for HILIC columns is filled.

[4] A method for analyzing oligosaccharides, comprising analyzing oligosaccharides in a HILIC mode using the HILIC column according to [3].

[5] The method for analyzing oligosaccharides according to [4],
wherein a composition of a mobile phase is constant during the measurement (in an isocratic elution condition) and a column temperature is constant during the measurement method for analyzing oligosaccharides.

[6] The method for analyzing oligosaccharides according to [4] or [5],
wherein a molecular size of the oligosaccharides to be analyzed is 17 mer or more.

According to the present invention, although a multimer component contained in oligosaccharides is difficult to be separated and analyzed by using conventional liquid chromatography, it becomes possible to separate and analyze the multimer component even under a simple condition applying an isocratic elution method without changing a mobile phase composition. In addition, the separation analysis can be performed under a constant temperature condition without using a complicated temperature control program.

DETAILED DESCRIPTION OF THE INVENTION

Hereinafter, the packing material for HILIC columns to which the present invention is applied, the HILIC column filled with the packing material, and the method for analyzing oligosaccharides using the column will be described in detail.

In the drawings used in the following description, some of the representative examples are shown for easy understanding of the features, and the scope of the invention is not limited. In addition, the materials, dimensions, and the like exemplified in the following description are merely examples, and the present invention is not limited thereto, and can be carried out by appropriately changing and modifying the gist without changing the gist thereof.

(Packing Material for HILIC Columns)

The packing material for HILIC columns of the present invention includes a cross-linked polymer base material having a hydroxyl group. The cross-linked polymer base material is porous particles, and preferably spherical particles. Glycidol is reacted with a hydroxyl group of the cross-linked polymer base material. The packing material for HILIC columns has a hydrophilicity index of 2.30 or more, and the packing material for HILIC columns has a surface-pH index of 0.95 or more and 1.05 or less. It is preferable that the polymer base material has a glycidol-derived diol structure on the surface thereof by reacting glycidol with its hydroxyl group.

The packing material for HILIC columns of one embodiment of the present invention includes a cross-linked polymer base material having a hydroxyl group. The cross-linked polymer base material is porous particles. It has a diol structure derived from glycidol on the surface of the cross-linked polymer base material particles. The packing material for HILIC columns has a hydrophilicity index of 2.30 or more, and the packing material for HILIC columns has a surface-pH index of 0.95 or more and 1.05 or less.

<Porous Cross-Linked Polymer Having Hydroxyl Group>

Examples of the porous cross-linked polymer having a hydroxyl group include a cross-linked polyvinyl alcohol (PVA) obtained by copolymerizing a vinyl acetate and triallyl isocyanurate (TAIC (registered trademark)) which is a crosslinkable monomer having a plurality of unsaturated double bonds, and then carrying out a saponification reaction. With respect to a mass ratio of monomer compositions of the copolymer, there is no particular limitation, but in order to develop a sufficient hydrophilicity by the subsequent glycidol addition reaction treatment, it is desirable to set a mass ratio of the crosslinkable monomer to 90% by mass or less, more preferably 80% by mass or less, and still more preferably 70% by mass or less. Further, in order to ensure a practical mechanical strength when porous particles are used as a packing material for a liquid chromatography, it is desirable to set a mass ratio of the crosslinkable monomer to 10% by mass or more, more preferably 20% by mass or more, and still more preferably 30% by mass or more. When the mechanical strength is insufficient, it is possible that an apparatus deforms due to a pressure generated by the mobile phase. As a result, the column is blocked, and the pressure exceeds a usable pressure range of the apparatus. Even if it does not cause deformation and blockage, primary particles of the copolymer constituting the porous packing material may desorb, and as a result, may interfere with the detection of the target substance depending on types of detectors used for the analysis.

A density of the hydroxyl group of the cross-linked polyvinyl alcohol (PVA) obtained by saponification is preferably in a range of 1.2 meq/g to 10.5 meq/g, more preferably in the range of 1.6 meq/g to 9.3 meq/g, and still more preferably in the range of 2.0 meq/g to 8.0 meq/g. Within this range, a glycidol can be sufficiently reacted, and an appropriate hydrophilicity can be imparted to the packing material.

Among the porous cross-linked polymers having a hydroxyl group, particularly, a cross-linked PVA using TAIC (registered trademark) as a crosslinkable monomer is preferable from the viewpoint that hydrophilicity is efficiently developed by contribution of both of hydroxyl groups contained in the structure of the PVA and hydroxyl groups formed by addition reaction of glycidol.

<Porous Particles>

Examples of a method for obtaining the aforementioned cross-linked copolymer having a hydroxyl group as porous particles include a suspension polymerization method which includes obtaining an oil phase by mixing a non-polymerizable organic solvent compatible with a monomer and a polymerization initiator, then suspending the oil phase in an aqueous phase to form an oil droplet having a desired size, and subsequently, obtaining particles by heating and stirring. Alternatively, the examples include a method in which the oil phase is dropped into the aqueous phase through a porous film typified by SPG (Shirasu Porous Glass) film or a micro flow path formed on a quartz substrate to form particles with desired sizes. In any of the methods for forming particles, a volume occupied by the non-polymerizable organic solvent mixed in the oil phase forms pores. The oil phase granulated in this way is subsequently heated and stirred in an aqueous phase to advance the polymerization reaction, giving strength as a cross-linked polymer. After the polymerization reaction, the non-polymerizable organic solvent is removed by washing with an organic solvent to finally obtain the porous materials.

The particles are preferably spherical. A particle size of the spherical particles is preferably 1 to 30 µm as a volume average particle diameter in order to obtain a sufficient separation performance and a high sensitivity, and more preferably 3 to 10 µm from the viewpoint that an excessive increase in pressure hardly occurs. The volume average particle diameter can be measured with a Coulter counter or an image analysis type particle size distribution measuring device. In order to obtain a desired particle size, a sieve-classification using a mesh or a particle size-control using an air classifier can also be performed.

In order to achieve both of separating performance and mechanical strength at the same time, the average pore diameter of the pores forming the porous layer is preferably from 3 to 30 nm, and more preferably from 10 to 25 nm from the viewpoint of obtaining sufficient separation performance. When the pore diameter is too small, a specific surface area becomes small and an ability to develop a hydrophilic interaction cannot be obtained sufficiently. If the pore diameter is too large, a mechanical strength cannot be maintained and there is a problem that the particles collapse due to the pressure generated in the column. The average pore diameter can be measured using a gas adsorption type specific surface area measuring device or a mercury porosimeter.

<Addition Reaction of Glycidol>

The above-obtained hydroxyl group-containing porous cross-linked polymer particles are treated by the addition reaction of glycidol to form a packing material for HILIC columns having sufficient hydrophilicity imparted to the particle surface. The addition reaction of glycidol can be carried out by heating and stirring, under the condition allowing the particles to coexist with glycidol, for example, adding a strong alkali agent such as potassium tert-butoxide. It is preferable that a hydroxyl group of the particles reacts with glycidol to form a glycidol-derived diol structure. In order to impart sufficient hydrophilicity, it is preferable that the glycidol to be reacted is present in an excess amount relative to functional groups reactive with glycidol, such as hydroxyl group or glycidyl group, contained in the particles. Further, by reacting the glycidol to such an extent that a sufficient hydrophilicity is exhibited, for example, when triallyl isocyanurate is used as a crosslinkable monomer, a basicity derived from a nitrogen atom introduced into the polymer decreases, and as a result, when used as a HILIC column, almost no ionic interaction including acid-base interaction is shown. As a result, it is possible to obtain a HILIC column in which a purely hydrophilic interaction is a main separation mode. Here, the wording of "a purely hydrophilic interaction is a main separation mode" means that an acid-base interaction, an electrostatic interaction or the like, other than the hydrophilic interaction are hardly used as a retention force. Although an addition reaction amount of glycidol for obtaining such effects depends on the hydroxyl group density of the porous cross-linked polymer particles having a hydroxyl group, it is preferably in the range of 1 mmol/g to 5 mmol/g per unit mass of the particles, and more preferably in the range of 2 mmol/g to 4 mmol/g.

As an indicator of a hydrophilicity of the packing material for HILIC columns obtained by reacting glycidol as described above, a hydrophilicity index defined by a separation coefficient $\alpha 1$ (U/2dU) can be used. The separation coefficient $\alpha 1$ (U/2dU) is obtained by performing a liquid chromatography measurement of a uridine (U) and a 2'-deoxyuridine (2dU) in a HILIC separation mode condition. Regarding the hydrophilicity index, larger the numerical value indicates, higher the hydrophilicity is.

Also, as an indicator showing a pH property of the surface corresponding to the ionic interaction including the acid-base interaction, a surface-pH index defined by a separation coefficient of $\alpha 2$ (Tb/Tp) can be used. The separation coefficient of $\alpha 2$ (Tb/Tp) is obtained by performing liquid chromatography measurement of a theobromine (Tb) and a theophylline (Tp) in a HILIC separation mode condition. Regarding the surface-pH index, a value of one shows exactly neutral, a value less than one shows basic, and a value greater than one shows acidic.

Each separation coefficient of $\alpha 1$ and $\alpha 2$ is a ratio of retention coefficients k of each substance. And each retention coefficient k is defined as $k=(t-t_0)/t_0$, in which to is an elution time of toluene and t is an elution time of each substance. A condition of a liquid chromatography measurement in the HILIC separation mode for obtaining the retention coefficient is shown as below: a column temperature is 30° C.; and a mobile phase is a mixed liquid of an acetonitrile and a water solution in a ratio (acetonitrile/water solution) of 90/10 (volume before mixing) wherein the water solution contains 10 mM acetic acid and 10 mM ammonium acetate. When using a condition other than the measurement condition, different results of retention factors and different separation coefficients are obtained, as a result, it is not possible to obtain the hydrophilicity index and the surface-pH index that define the scope of the present invention. The separation coefficient α1 (U/2dU) is equal to k1/k2, that is α1(U/2dU)=k1/k2, wherein k1 is a retention coefficient of an uridine, and k2 is a retention coefficient of a 2'-deoxyuridine. Also, the separation coefficient α2(Tb/Tp) is equal to k3/k4, that is α2(Tb/Tp)=k3/k4, wherein k3 is a retention coefficient of a theobromine, and k4 is a retention coefficient of a theophylline.

These indicators are a performance evaluation index of the HILIC column proposed by Ikegami et al in 2011 and are based on technologies generally applicable in the world (Journal of Chromatography A, vol. 1218, (2011), p. 5903-5919).

The packing material for HILIC columns of the present invention has a hydrophilicity index α1 (U/2dU) of 2.30 or more, preferably 2.30 or more and 2.50 or less; and has a surface-pH index α2 (Tb/Tp) is 0.95 or more and 1.05 or less, preferably 0.95 or more and 1.00 or less. When α1 (U/2dU) is smaller than 2.30, the hydrophilic interaction is not sufficient, and in order to obtain sufficient degree of separation in oligosaccharide analysis, the flow rate of the mobile phase must be extremely lowered, or it is necessary to use a gradient method in which the composition of the mobile phase is changed during the measurement. The gradient method is extremely complicated. Similarly, when α2 (Tb/Tp) is not within the range of 0.95 to 1.05, in order to obtain sufficient degree of separation in an oligosaccharide analysis, the flow rate of the mobile phase is extremely lowered; or it is necessary to use a gradient method in which the composition of the mobile phase is changed during the measurement. The gradient method is extremely complicated. In order to control to the above range, it is effective to obtain the optimum condition by changing a reaction time, a reaction temperature or a glycidol addition reaction amount when reacting glycidol.

A condition of measuring the separation coefficient a1 (U/2dU) which is a hydrophilicity index is shown as below: a composition of an eluent is a mixed liquid of an acetonitrile and a water solution in a ratio (acetonitrile/water solution) of 90/10 (volume before mixing) wherein the water solution contains 10 mM acetic acid and 10 mM ammonium acetate (pH 4.7); a flow rate is 0.55 mL/min; and a column temperature is 30° C. Under the condition, a sample prepared by dissolving 1.0 mg/mL of toluene, 0.1 mg/mL uridine, 0.1 mg/mL 2'-deoxyuridine in the eluent is injected (for example, 4 μL when a column size is 4.6 mm in inner diameter and 150 mm in length), and a retention time of each component is measured from the chromatogram obtained using a UV detector (wavelength 254 nm).

A condition of measuring the separation coefficient α2 (Tb/Tp) which is the surface-pH index is shown as below: a composition of an eluent is a mixed liquid of an acetonitrile and a water in a ratio (acetonitrile/water) of 90/10 (volume before mixing) wherein the water contains 10 mM acetic acid and 10 mM ammonium acetate (pH 4.7); a flow rate is 0.55 mL/min; and a column temperature is 30° C. Under this condition, a sample prepared by dissolving 1.0 mg/mL of toluene, theobromine 0.1 mg/mL, and theophylline 0.1 mg/mL in the eluent is injected (for example, 4 μL when a column size is 4.6 mm in inner diameter and 150 mm in length), and a retention time of each component is measured from the chromatogram obtained using a UV detector (wavelength 254 nm).

(HILIC Column)

The HILIC column according to the invention includes a packing material of the aforementioned present invention, and a cylindrical liquid chromatography casing (column housing) filled with the packing material.

The material of the column housing is not particularly limited as long as it is a material capable of withstanding a pressure generated when the mobile phase is flowed. For example, an example of the material of the column housing is a stainless steel or a polyetheretherketone (PEEK).

A housing size is not particularly limited, but in order to analyze with a high sensitivity with a high resolution, it is preferable that it is cylindrical and has an inner diameter of 1.0 to 4.6 mm and a length of 50 to 250 mm.

In order to obtain a column that can be analyzed with a good separation, it is necessary to properly fill the packing material. Examples of the filling method include a method of preparing a slurry in which a packing material is dispersed in a liquid, then sending the slurry to a housing using a pump, and pressurizing it. At this time, as the liquid used for preparing the slurry, it is preferable to use water or a mixture of water and a water-soluble organic solvent, in which a hydrophilic packing material is easily dispersed. Types of the water-soluble organic solvent include acetonitrile, methanol, THF and the like which are generally used for separation in the HILIC mode. Furthermore, in order to achieve good dispersion while water permeates into the porous packing material particles and forms a moderately hydrated state, a salt may be added. Examples of the salt include sodium chloride, sodium sulfate, sodium formate, sodium acetate, ammonium chloride, ammonium sulfate, ammonium formate, and ammonium acetate. It is preferable to choose an optimal one depending on the monomer composition and particle diameter of the cross-linked polymer particles. As the salt concentration, it is also preferable to choose an optimal one depending on the monomer composition and particle diameter of the cross-linked polymer particles. As the filling pressure, it is also preferable to choose an optimal one depending on the monomer composition and particle diameter of the cross-linked polymer particles, as well as depending on the housing size.

(Method for Analyzing Oligosaccharide)

The method for analyzing oligosaccharides in the present invention needs satisfying a requirement that the HILIC column obtained as described above is used. The method may use a general liquid chromatography measuring apparatus connected with a liquid feeding pump, an injector, and a detector. In the separation mode of the HILIC mode, a liquid in which water and a water-soluble organic solvent are mixed may be used as a mobile phase. As a composition of the mixed solution, a ratio of the organic solvent before mixing may be 50% by volume or more. A preferred range is from 50 to 95% by volume, more preferably from 60 to 90% by volume. When the ratio of the water-soluble organic solvent is less than 50% by volume, the hydrophilic interaction may decrease. When it exceeds 95% by volume, adsorption of the oligosaccharide may occur.

Examples of the water-soluble organic solvent include a nitrile such as acetonitrile; an alcohol such as methanol, ethanol, and isopropyl alcohol; an ether such as tetrahydrofuran; and a ketone such as acetone and methyl ethyl ketone.

Since the surface-pH property of the packing material of the HILIC columns of the present invention is nearly neutral, even if it is necessary to add a salt to the mobile phase, it may be added in a small amount. Examples of the salt include ammonium salts such as ammonium formate and ammonium acetate. For example, 1 to 25 mmol of the salt may be added in 1 L of the mixed solution. Depending on the type of the base material or the type of the sample to be analyzed, a retention time may be adjusted by adding the salt.

In the method for analyzing oligosaccharides of the present invention, since the excellent resolution of the HILIC column based on the high hydrophilicity of the packing material and near neutrality of the surface-pH property, it is possible to use an isocratic elution condition in which the composition of the mobile phase is constant during measurement and to use a condition in which the temperature is constant during measurement. Therefore, only by optimizing the mobile phase composition and the measurement temperature, it is possible to separate the multimer component to such a degree that the multimer component can be identified. In the conventional measurement method, it was impossible to measure a multimer component of 17 mer or more without using a gradient elution condition in which the composition of the mobile phase is changed stepwise. However, it becomes possible to measure a multimer component of 17 mer or more without using the gradient elution condition. Thus, it is possible to detect oligosaccharide components very easily.

Since saccharides, such as oligosaccharides, have a very small absorption of light at a wavelength of 254 nm which is generally used in a UV photodetector, a differential refractive index (RI) detector may be used as a detector for analysis. Also in the analysis method of the present invention, an RI detector may be suitably used. In addition, it is also possible to use a mass spectrometer, an evaporative light scattering detection (ELSD), or a corona charged particle detector (Corona CAD (registered trademark)). Since the surface-pH property is almost neutral, even if it is necessary to add salt to the mobile phase, it can be used in a small amount. Therefore, it is suitable to using a mass spectrometer, an ELSD, or a Corona CAD (registered trademark) because effect of salt is small.

EXAMPLE

Hereinafter, the effect of the present invention be more apparent by examples. It should be noted that the present invention is not limited to the following examples, but can be carried out by changing as appropriate within a range not changing the gist thereof.

Example 1

(1) Preparation of Packing Material 1
(Synthesis of Polyvinyl Alcohol Gel (Base Material))

A homogeneous mixture, which contained 100 g of vinyl acetate, 150 g of triallyl isocyanurate, 100 g of butyl acetate, 25 g of n-decane and 5 g of 2,2-azobisisobutyronitrile; and 1200 mL of water, in which 12 g of polyvinyl alcohol and 18 g of disodium hydrogen phosphate were dissolved, was placed in a 5 L three-necked flask equipped with a reflux condenser and stirred for 10 minutes. Subsequently, while stirring under a nitrogen gas stream, polymerization was carried out at 60° C. for 16 hours to obtain a granular copolymer. This copolymer was filtered, washed, acetone extracted and dried. Next, the copolymer, together with 3 L of caustic soda, was placed in a 5 L three-necked flask equipped with a reflux condenser, a nitrogen gas inlet tube and a stirrer and stirred for 20 hours at 15° C. in a nitrogen stream to saponify the copolymer. After that, this copolymer was filtrated, washed with water, further dried and air classification treatment were carried out. The hydroxyl group density of the polyvinyl alcohol copolymer obtained by saponification was 2.1 meq/g. As a result of particle size measurement using an image analysis type particle size distribution measuring apparatus (FPIA 3000 manufactured by Sysmex Corporation), the volume average particle diameter was 4.8 μm. Further, the average pore diameter measured by a gas adsorption type specific surface area measuring apparatus (BELSORP-mini manufactured by BEL Inc., Japan) was 13 nm.

The hydroxyl group density was measured by the following procedure. Approximately 2 g of the polyvinyl alcohol copolymer base material was dried under vacuum at 60° C. for 6 hours and then accurately weighed on a precision balance. A mixed solution of the total amount of the weighed base material, 17 mL of acetic anhydride and 33 mL of pyridine was quickly charged in a 50 mL Erlenmeyer flask. And then, a ball-in cooling pipe was installed at the top of the Erlenmeyer flask, and nitrogen gas was gently aerated from the top of the cooling pipe to flush out the air in the flask. While stirring with a magnetic stirrer, it was heated at 90° C. for 16 hours in an oil bath. After completion of heating, methanol was added little by little in total 15 mL and the base material was filtered with a glass filter. After further washing with 90 mL of methanol, vacuum-drying was carried out at 60° C. for 6 hours. The weight of the dried base material was weighed accurately on a precision balance and the difference was calculated in weight between before and after reacting acetic anhydride. Since the acetic acid fragment ($CH_3CO^-$: molecular weight 43) esterified to the hydroxyl group of the base material corresponds to the weight increase, the hydroxyl group density (unit: mmol/g) per weight of the base material was calculated accordingly.

(Surface Modification Treatment of Base Material)

10 g of the dried polyvinyl alcohol polymer obtained as described above, 10 g of glycidol, 1 g of potassium tert-butoxide and 100 mL of diethylene glycol dimethyl ether were placed in a separable flask and stirred at 60° C. for 20 hours, and then glycidol was reacted with the polyvinyl alcohol base material. The polymer after the treatment was washed with water and methanol, and then dried.

The addition amount of glycidol was determined gravimetrically and was 2 mmol/g per weight of the polyvinyl alcohol base material.

(2) Preparation of Column Filled with Packing Material 1

The prepared Packing Material 1 was dispersed in water to prepare a slurry, and the Packing Material 1 was filled by feeding and pressurizing the slurry to a column housing made from PEEK (manufactured by Tomoe Seisakusho Co., Ltd.), which had an inner diameter of 4.6 mm and a length of 150 mm, by using a liquid feeding pump at a constant pressure of 15 MPa for 10 minutes.

(3) Measurements of Hydrophilicity Index al (U/2dU) and Surface-pH Index α2(Tb/Tp) of Packing Material 1

By using the column filled with prepared Packing Material 1, a measurement was carried out under the following measurement condition by injecting 4 μL of a sample in which toluene 1.0 mg/mL, uridine 0.1 mg/mL, 2'-deoxyuridine 0.1 mg/mL, theobromine 0.1 mg/mL, and theophylline 0.1 mg/mL were dissolved in an eluent. The obtained chromatogram was shown in FIG. 3.

Figure 3:
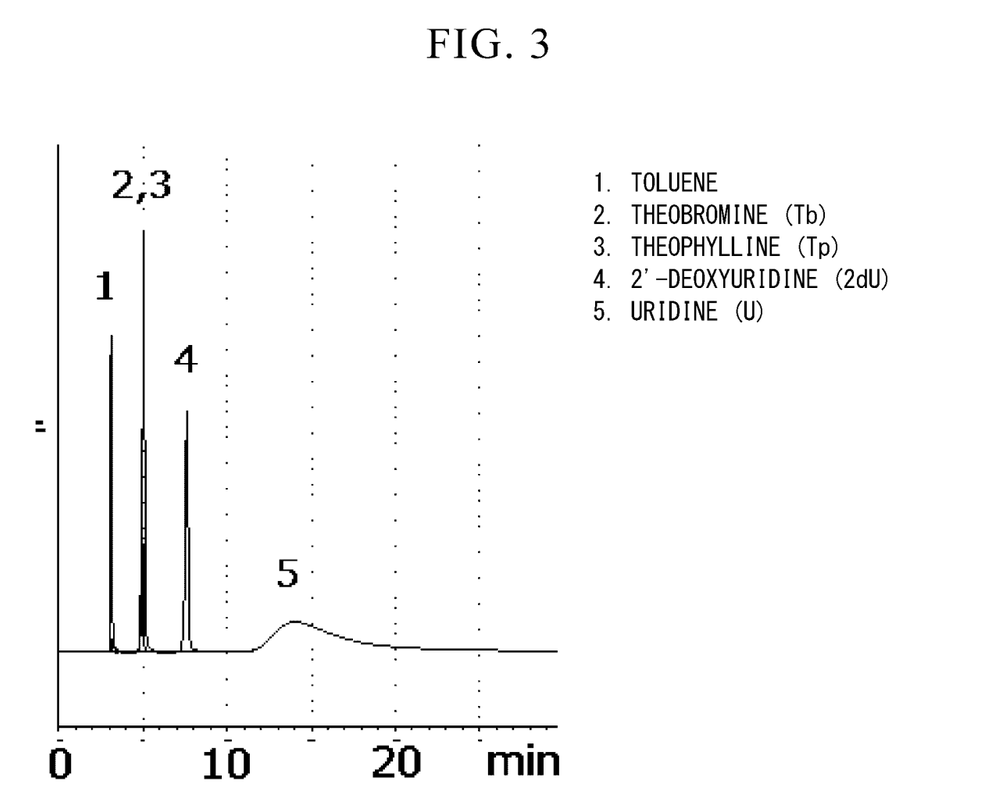
FIG. 3 is a chromatogram when a separation coefficient α1 (U/2dU) and a separation coefficient α2 (Tb/Tp) were measured.

Eluent composition: a mixed liquid of an acetonitrile and a water solution (pH4.7) in a ratio (acetonitrile/water solution) of 90/10 (volume before mixing) wherein the water solution contained 10 mM acetic acid and 10 mM ammonium acetate.

Flow rate: 0.55 mL/min,
Column temperature: 30° C.
Detector: UV detector (wavelength 254 nm).

From the chromatogram, a retention time of each component of toluene, uridine and 2'-deoxyuridine was measured and then a hydrophilicity index α1(U/2dU) was determined to be 2.40.

From the chromatogram, a retention time of each component of toluene, theobromine, and theophylline was measured, and a surface-pH index of α2(Tb/Tp) was determined to be 0.95.

(4) Measurement of Oligosaccharide by Using Column Filled with Packing Material 1

Figure 1:
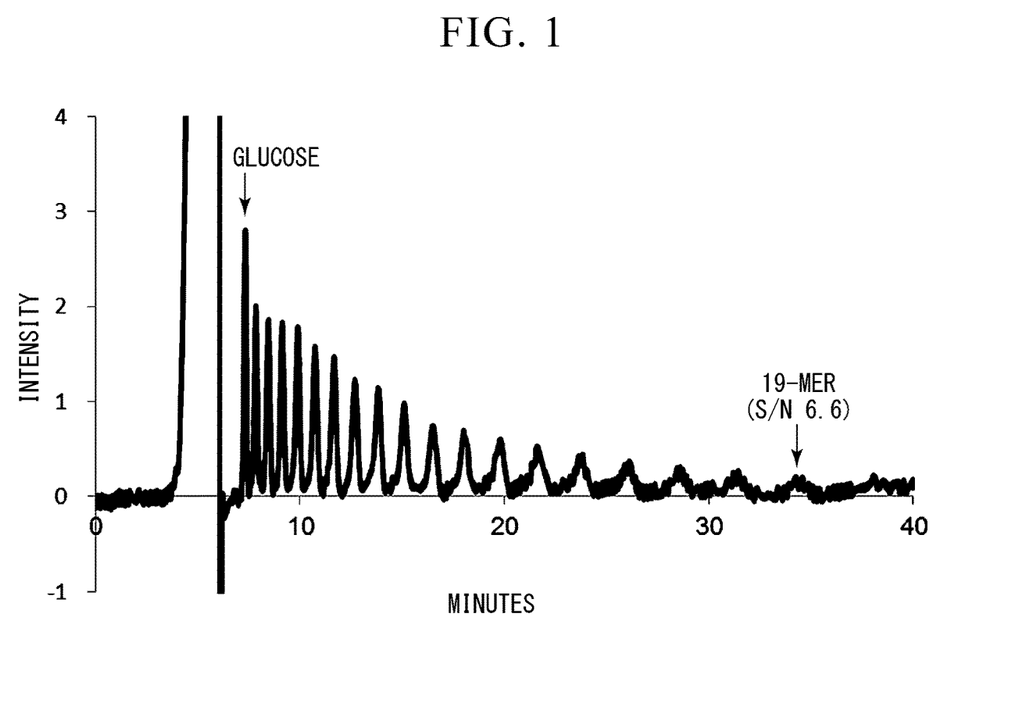
FIG. 1 is a chromatogram of oligosaccharide analysis obtained under the condition described in Example 1.

By using a column filled with prepared Packing Material 1, a sample was analyzed under the following measurement condition. The obtained chromatogram was shown in FIG. 1.
Eluent composition: acetonitrile/water=60/40,
Flow rate: 0.3 mL/min,
Column temperature: 40° C.
Detector: RI detector.

An analytical sample prepared by dissolving a solid content, which was obtained by dissolving 40 mg of dextran (molecular weight 4000 to 6000) in 1 mL of 1 mol/L HCl, stirring it at 100° C. for 15 minutes and then distilling off moisture, in a mixed solution containing acetonitrile and water in a ratio of acetonitrile/water=50/50 at 0.1% by weight was used. If a ratio between a signal, which can be identified as a peak, and a noise (signal/noise) is 2.0 or more, the presence of a 19 mer (S/N ratio: 6.6) can be confirmed.

Example 2

<Preparation of Packing Material 2>

Packing Material 2 was obtained in the same manner as in Example 1 except that in the process of preparing Packing Material 1 described in Example 1, the time of the surface modification treatment reaction at 60° C. was changed to 6 hours.

<Hydrophilicity Index, Surface-pH Index>

Hydrophilicity index α1(U/2dU) which was measured in the same manner as in Example 1 was obtained as 2.30. Further, surface-pH index α2(Tb/Tp) which was measured in the same manner as in Example 1 was obtained as 0.95.

<Oligosaccharide Analysis>

As a result of oligosaccharide analysis under the same condition as in Example 1, up to 18 mer (S/N ratio 4.7) was identified. No significant baseline drift or irregular separation of oligosaccharide peaks was observed.

Example 3

<Preparation of Packing Material 3>

Packing Material 3 was obtained in the same manner as in Example 1 except that in the process of preparing Packing Material 1 described in Example 1, the condition of the surface modification treatment reaction was changed to 80° C. and 6 hours.

<Hydrophilicity Index, Surface-pH Index>

Hydrophilicity index α1(U/2dU) which was measured in the same manner as in Example 1 was obtained as 2.31. Further, surface-pH index α2(Tb/Tp) which was measured in the same manner as in Example 1 was obtained as 1.05.

<Oligosaccharide Analysis>

As a result of oligosaccharide analysis under the same condition as in Example 1, up to 17 mer (S/N ratio 5.3) was identified. No significant baseline drift or irregular separation of oligosaccharide peaks was observed.

Example 4

<Preparation of Packing Material 4>

Packing Material 4 was obtained in the same manner as in Example 1 except that in the process of preparing Packing Material 1 described in Example 1, the condition of the surface modification treatment reaction was changed to 80° C. and 20 hours.

<Hydrophilicity Index, Surface-pH Index Index>

Hydrophilicity index α1(U/2dU) which was measured in the same manner as in Example 1 was obtained as 2.40. Further, surface-pH index α2(Tb/Tp) which was measured in the same manner as in Example 1 was obtained as 1.05.

<Oligosaccharide Analysis>

As a result of oligosaccharide analysis under the same condition as in Example 1, up to 17 mer (S/N ratio 2.3) was identified. No significant baseline drift or irregular separation of oligosaccharide peaks was observed.

Example 5

<Production of Packing Material 5>

Packing Material 5 was obtained in the same manner as in Example 1 except that in the process of preparing Packing Material 1 described in Example 1, the amount of glycidol used in the surface modification treatment reaction was changed to 20 g.

<Hydrophilicity Index, Surface-pH Index Index>

Hydrophilicity index α1(U/2dU) which was measured in the same manner as in Example 1 was obtained as 2.49. Further, surface-pH index α2(Tb/Tp) which was measured in the same manner as in Example 1 was obtained as 0.95.

<Oligosaccharide Analysis>

As a result of oligosaccharide analysis under the same condition as in Example 1, up to 19 mer (S/N ratio 6.1) was identified. No significant baseline drift or irregular separation of oligosaccharide peaks was observed.

Example 6

<Preparation of Packing Material 6>

Packing Material 6 was obtained in the same manner as in Example 1 except that in the process of preparing Packing Material 1 described in Example 1, the amount of glycidol used in the surface modification treatment reaction was 20 g and the condition of surface modification treatment reaction was changed to 80° C. and 20 hours.

<Hydrophilicity Index, Surface-pH Index>

Hydrophilicity index α1(U/2dU) which was measured in the same manner as in Example 1 was obtained as 2.48. Further, surface-pH index α2(Tb/Tp) which was measured in the same manner as in Example 1 was obtained as 1.04.

<Oligosaccharide Analysis>

As a result of oligosaccharide analysis under the same condition as in Example 1, up to 18 mer (S/N ratio 5.2) was identified. No significant baseline drift or irregular separation of oligosaccharide peaks was observed.

Example 7

<Production of Packing Material 7>

Packing Material 2 was obtained in the same manner as in Example 1 except that in the procedure of synthesizing polyvinyl alcohol gel described in Example 1, the wind classification condition was changed so that the average particle diameter was 3.5 µm. The average pore diameter was 12 nm.

<Hydrophilicity Index, Surface-pH Index Index>
Hydrophilicity index α1(U/2dU) which was measured in the same manner as in Example 1 was obtained as 2.40. Further, surface-pH index α2(Tb/Tp) which was measured in the same manner as in Example 1 was obtained as 1.00.

<Oligosaccharide Analysis>
As a result of oligosaccharide analysis under the same condition as in Example 1, up to 18 mer (S/N ratio 3.3) was identified. No significant baseline drift or irregular separation of oligosaccharide peaks was observed Comparative Example 1

<Preparation of Packing Material 8>
Packing Material 8 was obtained in the same manner as in Example 1 except that in the process of preparing Packing Material 1 described in Example 1, the amount of glycidol used in the surface modification treatment reaction was 20 g and the conditions of the surface modification treatment reaction were changed to 50° C. and 20 hours.

<Hydrophilicity Index, Surface-pH Index Index>
Hydrophilicity index α1(U/2dU) which was measured in the same manner as in Example 1 was obtained as 2.41. Further, surface-pH index α2(Tb/Tp) which was measured in the same manner as in Example 1 was obtained as 0.93.

<Oligosaccharide Analysis>
As a result of oligosaccharide analysis under the same condition as in Example 1, up to 12 mer (S/N ratio 2.8) was identified. No significant baseline drift or irregular separation of oligosaccharide peaks was observed.

Comparative Example 2

<Preparation of Packing material 9>
Packing Material 9 was obtained in the same manner as in Example 1 except that in the process of preparing Packing Material 1 described in Example 1, the amount of glycidol used in the surface modification treatment reaction was 20 g and the condition of the surface modification treatment reaction was changed to 80° C. and 6 hours.

<Hydrophilicity Index, Surface-pH Index Index>
Hydrophilicity index α1(U/2dU) which was measured in the same manner as in Example 1 was obtained as 2.40. Further, surface-pH index α2(Tb/Tp) which was measured in the same manner as in Example 1 was obtained as 1.06.

<Oligosaccharide Analysis>
As a result of oligosaccharide analysis under the same condition as in Example 1, up to 11 mer (S/N ratio 4.3) was identified. No significant baseline drift or irregular separation of oligosaccharide peaks was observed.

Comparative Example 3

<Preparation of Packing Material 10>
Packing Material 10 was obtained in the same manner as in Example 1 except that in the process of preparing Packing Material 1 described in Example 1, the amount of glycidol used in the surface modification treatment reaction was 7 g.

<Hydrophilicity Index, Surface-pH Index>
Hydrophilicity index α1(U/2dU) which was measured in the same manner as in Example 1 was obtained as 2.23. Further, surface-pH index α2(Tb/Tp) which was measured in the same manner as in Example 1 was obtained as 0.99.

<Oligosaccharide Analysis>
As a result of oligosaccharide analysis under the same condition as in Example 1, up to 10 mer (S/N ratio 3.0) was identified. No significant baseline drift or irregular separation of oligosaccharide peaks was observed.

Comparative Example 4

As a HILIC column, Showa Denko KK Asahipak NH2P-50 4D (internal diameter 4.6 mm, length 150 mm) was used. Hydrophilicity index α1(U/2dU) which was measured in the same manner as in Example 1 was obtained as 2.25. Further, surface-pH index α2(Tb/Tp) which was measured in the same manner as in Example 1 was obtained as 0.37.

Figure 2:
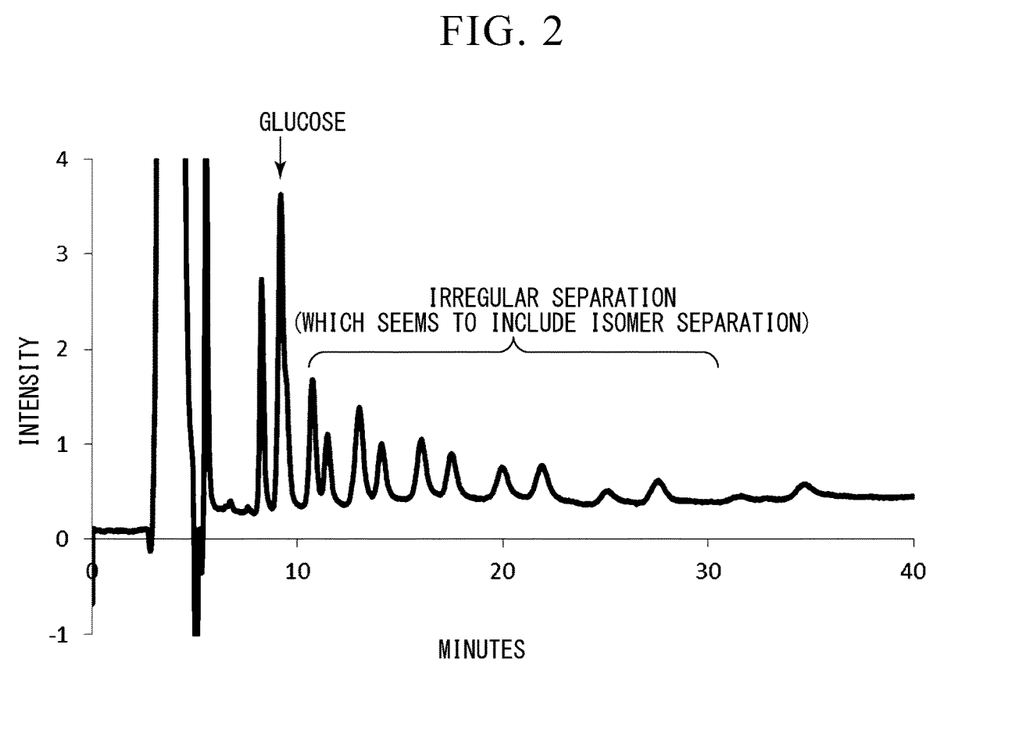
FIG. 2 is a chromatogram of oligosaccharide analysis obtained under the condition described in Comparative Example 4.

As a result of oligosaccharide analysis under the same condition as in Example 1, a chromatogram shown in FIG. 2 was obtained. Irregularities of peak separation, which seemed to involve isomer separation, were observed, and correct measurements were impossible.

TABLE 1

| | Packing Material No. or column name | Average pore radius [nm] | Hydrophilicity index α1 (U/2dU) | Surface pH index α2 (Tb/Tp) | Oligosaccharide size of identified peak with S/N ratio 2.0 or more |
|---|---|---|---|---|---|
| Example 1 | Packing Material 1 | 13 | 2.40 | 0.95 | 19 mer |
| Example 2 | Packing Material 2 | 13 | 2.30 | 0.95 | 18 mer |
| Example 3 | Packing Material 3 | 13 | 2.31 | 1.05 | 17 mer |
| Example 4 | Packing Material 4 | 13 | 2.40 | 1.05 | 17 mer |
| Example 5 | Packing Material 5 | 13 | 2.49 | 0.95 | 19 mer |
| Example 6 | Packing Material 6 | 13 | 2.48 | 1.04 | 18 mer |
| Example 7 | Packing Material 7 | 13 | 2.40 | 1.00 | 18 mer |
| Comparative Example 1 | Packing Material 8 | 13 | 2.41 | 0.93 | 12 mer |
| Comparative Example 2 | Packing Material 9 | 13 | 2.40 | 1.06 | 11 mer |

TABLE 1-continued

| Packing Material No. or column name | Average pore radius [nm] | Hydrophilicity index α1 (U/2dU) | Surface pH index α2 (Tb/Tp) | Oligosaccharide size of identified peak with S/N ratio 2.0 or more |
|---|---|---|---|---|
| Comparative Example 3 — Packing Material 10 | 13 | 2.23 | 0.99 | 10 mer |
| Comparative Example 4 — NH2P-50 | 13 | 2.25 | 0.37 | — |

The invention claimed is:

1. A packing material for HILIC columns, comprising a cross-linked polymer base material having a hydroxyl group,
wherein the cross-linked polymer base material is porous particles;
a glycidol is reacted with the hydroxyl group of the cross-linked polymer base material;
the packing material has a hydrophilicity index of 2.30 or more; and
the packing material has a surface-pH index of from 0.95 to 1.05,
wherein the hydrophilicity index is defined by a separation coefficient of α1 (U/2dU), when performing a liquid chromatography measurement of a uridine (U) and a 2'-deoxyuridine (2dU) in a HILIC separation mode condition;
the surface-pH index is a separation coefficient of α2 (Tb/Tp), when performing a liquid chromatography measurement of a theobromine (Tb) and a theophylline (Tp) in a HILIC separation mode condition;
the separation coefficient α1 (U/2dU) and the separation coefficient α2 (Tb/Tp) are ratios of retention factors k of the materials, respectively;
each retention factor k is defined by $k=(t-t_0)/t_0$, wherein $t_0$ is an elution time of toluene and, t is an elution time of each substance; and
a condition of the liquid chromatography measurement in the HILIC separation mode is shown as below:
a column temperature is 30° C.; and
a mobile phase is a mixed liquid of acetonitrile and an aqueous solution in a ratio (acetonitrile/aqueous solution) of 90/10 (volume before mixing) wherein the aqueous solution contains 10 mM acetic acid and 10 mM ammonium acetate.

2. The packing material for HILIC columns according to claim 1, wherein the porous cross-linked polymer base material having a hydroxyl group is a copolymer of vinyl alcohol and triallyl isocyanurate.

3. A HILIC column, comprising
the packing material for HILIC columns according to claim 1, and
a liquid chromatography casing in which the packing material for HILIC columns is filled.

4. A method for analyzing oligosaccharides, comprising analyzing oligosaccharides in a HILIC mode using the HILIC column according to claim 3.

5. The method for analyzing oligosaccharides according to claim 4,
wherein a composition of a mobile phase is constant during the measurement (in an isocratic elution condition) and a column temperature is constant during the measurement method for analyzing oligosaccharides.

6. The method for analyzing oligosaccharides according to claim 4,
wherein a molecular size of the oligosaccharides to be analyzed is 17 mer or more.

7. The packing material for HILIC columns according to claim 1,
wherein a particle size of the porous particles is 1 to 30 μm as a volume average particle diameter, and
an average pore diameter of pores forming the porous particles is from 3 to 30 nm.

* * * * *